(12) United States Patent
Merz et al.

(10) Patent No.: US 11,370,293 B2
(45) Date of Patent: Jun. 28, 2022

(54) ELECTRICAL DRIVE UNIT FOR A MOTOR VEHICLE AND MOTOR VEHICLE

(71) Applicant: Bayerische Motoren Werke Aktiengesellschaft, Munich (DE)

(72) Inventors: Felix Merz, Munich (DE); Yann Tremaudant, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 166 days.

(21) Appl. No.: 16/967,801

(22) PCT Filed: May 15, 2019

(86) PCT No.: PCT/EP2019/062402
§ 371 (c)(1),
(2) Date: Aug. 6, 2020

(87) PCT Pub. No.: WO2019/238343
PCT Pub. Date: Dec. 19, 2019

(65) Prior Publication Data
US 2021/0039491 A1 Feb. 11, 2021

(30) Foreign Application Priority Data
Jun. 12, 2018 (DE) .................... 10 2018 209 340.7

(51) Int. Cl.
*B60K 11/02* (2006.01)
*F16H 57/04* (2010.01)
(Continued)

(52) U.S. Cl.
CPC ............ *B60K 11/02* (2013.01); *F16H 57/043* (2013.01); *F16H 57/0417* (2013.01);
(Continued)

(58) Field of Classification Search
CPC ... B60K 11/02; B60K 2001/006; H02P 29/62; F16H 57/0417; F16H 57/043;
(Continued)

(56) References Cited

U.S. PATENT DOCUMENTS

2015/0377537 A1* 12/2015 West .................... F25B 31/006
62/115
2016/0010520 A1 1/2016 Will

FOREIGN PATENT DOCUMENTS

DE 10 2011 012 723 A1 8/2012
DE 10 2011 115 279 A1 12/2012
(Continued)

OTHER PUBLICATIONS

International Search Report (PCT/ISA/210) issued in PCT Application No. PCT/EP2019/062402 dated Jul. 24, 2019 with English translation (five pages).
(Continued)

*Primary Examiner* — Jacob M Amick
(74) *Attorney, Agent, or Firm* — Crowell & Moring LLP

(57) ABSTRACT

An electric drive unit for a motor vehicle includes an electrical machine having a stator and a rotor. An inverter having a first switch unit energizes a first phase system (U, V, W) of the stator. A transmission is connected to the rotor for torque transmission. A lubricant circuit lubricates the transmission and/or cools the rotor. A first cooling circuit cools the first switch unit. A lubricant-coolant heat exchanger thermally couples the first coolant circuit and the lubricant circuit. A control device provides a dissipation-increasing operating mode for the first switch unit in order to increase a dissipation heating a coolant of the first coolant circuit. The lubricant-coolant heat exchanger transfers heat from the heated coolant to the lubricant circuit in order to reduce a viscosity of a lubricant.

10 Claims, 1 Drawing Sheet

(51) Int. Cl.
  *H02K 1/32* (2006.01)
  *H02K 9/19* (2006.01)
  *H02P 29/62* (2016.01)
  *H02K 7/116* (2006.01)
  *B60K 1/00* (2006.01)

(52) U.S. Cl.
  CPC ........... *F16H 57/0476* (2013.01); *H02K 1/32* (2013.01); *H02K 7/116* (2013.01); *H02K 9/19* (2013.01); *H02P 29/62* (2016.02); *B60K 2001/006* (2013.01); *B60Y 2306/03* (2013.01); *B60Y 2400/61* (2013.01)

(58) Field of Classification Search
  CPC ...... F16H 57/0476; H02K 1/32; H02K 7/116; H02K 9/19; B60Y 2306/03; B60Y 2400/61
  See application file for complete search history.

(56) References Cited

FOREIGN PATENT DOCUMENTS

| | | |
|---|---|---|
| DE | 10 2013 101 844 A1 | 8/2014 |
| DE | 10 2015 214 309 A1 | 2/2017 |
| DE | 10 2015 221 310 A1 | 5/2017 |
| DE | 10 2016 211 762 A1 | 1/2018 |
| EP | 1 453 187 A2 | 9/2004 |
| EP | 1 453 187 B1 | 9/2009 |

OTHER PUBLICATIONS

German-language Written Opinion (PCT/ISA/237) issued in PCT Application No. PCT/EP2019/062402 dated Jul. 24, 2019 (seven pages).
German-language Office Action issued in German Application No. 10 2018 209 340.7 dated Feb. 19, 2019 (six pages).
German-language Decision to Grant issued in German Application No. 10 2018 209 340.7 dated Mar. 14, 2019 (five pages).

* cited by examiner

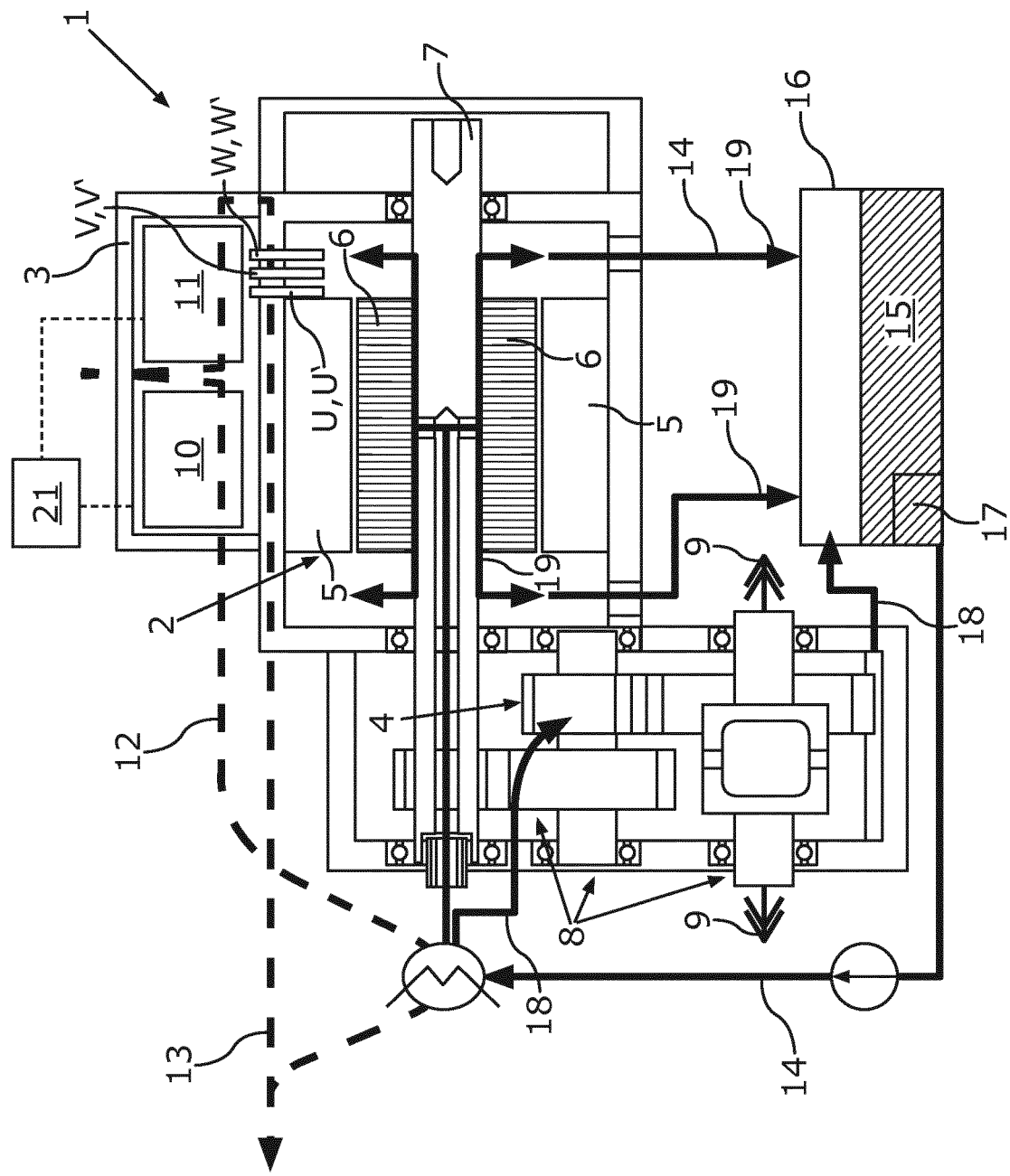

ELECTRICAL DRIVE UNIT FOR A MOTOR VEHICLE AND MOTOR VEHICLE

BACKGROUND AND SUMMARY OF THE INVENTION

The disclosed subject matter relates to an electric drive unit for a motor vehicle, exhibiting an electric machine with a stator and a rotor, an inverter, connected upstream of the electric machine, with a first switching unit for energizing a first phase system of the stator, a gear mechanism connected to the rotor for the purpose of transmitting torque, a lubricant circuit for lubricating the gear mechanism and/or for cooling the rotor, a first coolant circuit for cooling the first switching unit, and a lubricant/coolant heat-exchanger for thermal coupling of the first coolant circuit and the lubricant circuit. The disclosed subject matter relates, in addition, to a motor vehicle.

In the present case, interest is directed toward electric drive units for electrically drivable motor vehicles, for instance electric vehicles or hybrid vehicles. Such drive units customarily exhibit an electric machine, for instance a rotating-field machine, an inverter and also a gear mechanism. In this case, it is customary that the inverter connected upstream of the electric machine is cooled, for instance by being arranged in a coolant circuit and by being flowed through by a coolant or refrigerant circulating in the coolant circuit.

The electric drive unit may also exhibit a lubricant circuit in which the gear mechanism is arranged. For the purpose of minimizing frictional losses, the gear mechanism is lubricated by a lubricant circulating in the lubricant circuit, for instance oil. The lubricant being used can, in addition, be used for the purpose of cooling a rotor of the electric machine. Accordingly, the rotor is likewise arranged in the lubricant circuit and can be flowed through by the lubricant. In this case there may be provision that the lubricant circuit for the gear mechanism and the coolant circuit for the inverter have been thermally coupled with one another via a lubricant/coolant heat-exchanger for the purpose of transferring heat between the coolant circuit and the lubricant circuit. By this means, the coolant circuit can also be used for the purpose of cooling the lubricant of the lubricant circuit.

In particular when the motor vehicle is being started, however, a temperature of the lubricant is low and, as a result, a viscosity of the lubricant is very high. Only after a certain period of time does the lubricant warm up during the operation of the motor vehicle to a temperature at which the viscosity lies within a target range. During this warming-up period, however, the high viscosity of the lubricant results in increased losses at the gear mechanism.

It is an object of the present subject matter to provide a particularly low-loss electric drive unit for an electrically drivable motor vehicle.

In accordance with the disclosed subject matter, this object is achieved by an electric drive unit and also by a motor vehicle with the features according to the respective independent claims. Advantageous embodiments of the disclosed subject matter are the subject-matter of the dependent claims, of the description and also of the FIGURE.

An electric drive unit according to the disclosed subject matter for a motor vehicle exhibits an electric machine with a stator and a rotor, an inverter, connected upstream of the electric machine, with a first switching unit for energizing a first phase system of the stator, and also a gear mechanism connected to the rotor for the purpose of transmitting torque. Furthermore, the drive unit exhibits a lubricant circuit for the gear mechanism for the purpose of lubricating the gear mechanism, and/or for the rotor for the purpose of cooling the rotor. In addition to this, the drive unit exhibits a first coolant circuit for the first switching unit of the inverter, for the purpose of cooling the first switching unit. A lubricant/coolant heat-exchanger serves for thermal coupling of the first coolant circuit and the lubricant circuit. In addition to this, the electric drive unit includes a control device which is designed to provide a loss-increasing operating mode for the first switching unit for the purpose of increasing power dissipation, heating up the coolant of the first coolant circuit, of the first switching unit. The lubricant/coolant heat-exchanger is designed to transmit heat, resulting from the increased power dissipation, of the heated coolant to the lubricant circuit for the purpose of decreasing a viscosity of the lubricant.

The electric drive unit may be, for instance, an electric machine with integrated power electronics or with integrated inverter and integrated gear mechanism. In this case, the electric machine, the inverter and the gear mechanism may have been arranged in a common housing, so that the drive unit is of particularly compact design. The electric machine may be, for instance, an n-phase rotating-field machine, the n phases of which are energized by an n-phase inverter connected upstream. For instance, it is possible that n=3, so that the rotating-field machine takes the form of a three-phase rotating-field machine and exhibits precisely one phase system with the three phases. The inverter then includes precisely one switching unit exhibiting three parallel-connected half-bridges with switches, each half-bridge being electrically connected to a phase of the electric machine. It is also possible that n=6, so that the rotating-field machine takes the form of a six-phase rotating-field machine and exhibits two phase systems, each with three phases. The inverter may then include two switching units each exhibiting three parallel-connected half-bridges with switches.

For the purpose of energizing the phases of the electric machine, the switches of the first switching unit are switched by the control device in accordance with a predetermined switching pattern. The switches may be power semiconductors, for instance IGBTs or power MOSFETs. By reason of the power dissipation arising during the operation of the first switching unit, the first switching unit is cooled. For this purpose, the first switching unit has been arranged in the first coolant circuit and is flowed through by the coolant, for instance water, circulating in the first coolant circuit. In this way, a lower temperature can be provided for the first switching unit. By this means, the electric machine can be operated with a high efficiency while the first switching unit of the inverter is reliably protected against overheating.

For the purpose of reducing a friction of the gear mechanism of the drive unit, the gear mechanism has been arranged in the lubricant circuit. The lubricant circuit exhibits a reservoir, for instance an oil pan, from which the lubricant, for instance oil, can be reliably conducted to points of friction in the gear mechanism. As a result, losses in the gear mechanism can be lessened. The lubricant circulating in the lubricant circuit can also flow through the rotor of the electric machine for the purpose of cooling, the rotor taking the form of, for instance, a hollow body for this purpose.

The lubricant circuit and the coolant circuit are thermally coupled via the lubricant/coolant heat-exchanger—heat-exchanger for short. Consequently a cooling, for instance, of the lubricant can take place, in order that the temperature thereof does not exceed an upper temperature limit, for instance 100° C. For this purpose, heat can be transferred from the lubricant circuit to the coolant circuit. But if the temperature of the lubricant falls below a lower temperature limit, for instance 60° C., the viscosity of the lubricant is very high. Expressed otherwise, the lubricant is very viscous at low temperatures and can consequently only be conveyed with difficulty to the points of friction in the gear mechanism. Therefore the lubricant is heated up for the purpose of decreasing the viscosity. For this purpose, the control device places the first switching unit of the inverter in the loss-increasing operating mode, which differs from a loss-optimal operating mode. By the "loss-increasing operating mode", an operating mode is accordingly to be understood in which the switching unit "generates" a higher power dissipation than in the loss-optimal operating mode. Accordingly, by virtue of the loss-increasing operating mode the power dissipation emitted by the first switching unit is deliberately increased.

This power dissipation is emitted, in the form of dissipated heat or waste heat, to the coolant flowing through the first switching unit, which thereupon warms up. By virtue of the loss-increasing switching behavior, the coolant of the first coolant circuit is accordingly actively heated up. This heat is supplied to the heat-exchanger connected downstream of the first switching unit in the first coolant circuit, and the heat-exchanger transfers the heat to the lubricant circuit. By this means, the lubricant circulating in the lubricant circuit warms up, as a result of which the viscosity thereof can be decreased.

By virtue of the loss-increasing actuation of the first switching unit, the viscosity of the lubricant can be decreased without additional components, for instance a separate heater, having to be provided in the drive unit. Consequently, losses in the gear mechanism of the drive unit can be lessened in straightforward manner.

In this connection there may be provision that the control device is designed to increase switching losses of switches of the first switching unit for the purpose of increasing the power dissipation, and for this purpose to switch the switches in the loss-increasing operating mode at a switching frequency higher than a predetermined threshold value of the switching frequency. At switching frequencies below the threshold value, the first switching unit is operated in the loss-optimal operating mode. For the purpose of increasing the power dissipation, the switching frequency of the first switching unit is increased. There may also be provision that for the purpose of increasing the power dissipation the control device is designed to actuate switches of the first switching unit in such a manner that a power transmitted to the electric machine by the first switching unit is higher than a predetermined power threshold value. By the switches of the first switching unit being actuated, the power dissipation emitted by the first switching unit can be increased in straightforward manner for the purpose of decreasing the viscosity of the lubricant.

There may be provision that the first coolant circuit is additionally designed for cooling the stator, in which case the coolant circulating in the first coolant circuit flows from the first switching unit in the direction of the stator. The first switching unit and the stator have accordingly been arranged in series in the cooling circuit. For instance, a laminated core of the stator may exhibit cooling ducts which are flowed through by the coolant. Alternatively or additionally, the coolant can be routed along an outside of the laminated core for the purpose of cooling the stator. By virtue of the cooling of the stator by means of the first coolant circuit and, in particular, by virtue of the cooling of the rotor by means of the lubricant circuit, the electric machine can be operated particularly efficiently.

In this connection it proves to be advantageous if the lubricant/coolant heat-exchanger has been arranged between the first switching unit and the stator in the first coolant circuit for the purpose of preventing a supply of heated coolant to the stator. By this means, the heat emitted to the coolant by virtue of the loss-increasing operating mode can be passed on to the lubricant via the heat-exchanger before the coolant flows through the stator. Consequently an undesirable warming of the stator can be prevented and hence an efficient operation of the electric machine can be provided also in the loss-increasing operating mode of the first switching unit.

Particularly preferably, the inverter exhibits a second switching unit for energizing a second phase system of the stator. The electric drive unit exhibits a second coolant circuit for the second switching unit and also for the stator, the control device being designed to provide a loss-optimal operating mode for the second switching unit during the loss-increasing operating mode of the first switching unit. In particular, the electric machine takes the form of a six-phase rotating-field machine with two three-phase phase systems, and the inverter takes the form of a six-phase inverter with two switching units. The two parallel switching units of the inverter can be operated asymmetrically in the two different operating modes. Accordingly, the loss-increasing operating mode can be provided for the first switching unit by the control device, whereas the loss-optimal operating mode is provided for the second switching unit. For instance, the switching frequency of the switches of the first switching unit may be higher than the switching frequency of the switches of the second switching unit. Alternatively or additionally, a proportion of power transmitted via the first switching unit may be greater than a proportion of power transmitted via the second switching unit.

In addition, the switching units are cooled by different, parallel coolant circuits. The first coolant circuit serves, in particular, only for cooling the first switching unit and for transporting dissipated heat to the heat-exchanger. The second coolant circuit is, in particular, not thermally coupled with the heat-exchanger and serves for cooling the second switching unit and the stator. In this way, during the diminution of the viscosity of the lubricant by the first switching unit the second switching unit and the stator can be reliably cooled by means of the second coolant circuit.

In a further development of the disclosed subject matter, the control device is designed to provide the loss-increasing operating mode for the first switching unit only when a temperature of the lubricant lies below a predetermined lower temperature limit, in particular 60° C. For instance, the temperature of the lubricant can be registered by means of a temperature sensor, and the loss-increasing switching behavior for the switches can be provided if the temperature of the lubricant lies below the lower temperature limit. This is because the viscosity of the lubricant below this lower temperature limit is undesirably high. This temperature arises, in particular, in the course of the procedure for starting the motor vehicle or in the course of driving it away if the motor vehicle had been parked.

It proves to be advantageous if the control device is designed to determine the power dissipation that is necessary for decreasing the viscosity as a function of a temperature of the lubricant, and to actuate the first switching unit in the loss-increasing operating mode in such a manner that the first switching unit provides the necessary power dissipation. For instance, loss-increasing switching-frequency values and/or power values may have been assigned to certain temperature values of the lubricant. For the purpose of providing the power dissipation that is necessary for decreasing the viscosity at the current temperature of the lubricant, the associated switching-frequency value and/or the associated power value can then be selected by the control device from the preset assignment, and provided for the first switching unit.

A motor vehicle according to the disclosed subject matter includes an electric drive unit according to the disclosed subject matter, or an embodiment thereof. The motor vehicle has been constructed, in particular, as an electric vehicle or hybrid vehicle in the form of a passenger car.

The embodiments presented with reference to the electric drive unit according to the disclosed subject matter, and the advantages thereof, apply correspondingly to the motor vehicle according to the disclosed subject matter.

Further features of the disclosed subject matter result from the claims, the FIGURE and the description of the FIGURE. The features and combinations of features mentioned above in the description and also the features and combinations of features mentioned below in the description of the FIGURE and/or shown on their own in the FIGURE can be used not only in the respectively specified combination but also in other combinations or in isolation.

The disclosed subject matter will now be elucidated in more detail on the basis of a preferred embodiment example and with reference to the drawing.

BRIEF DESCRIPTION OF THE DRAWINGS

The single FIGURE shows a schematic representation of an embodiment of an electric drive unit according to the disclosed subject matter.

DETAILED DESCRIPTION OF THE DRAWINGS

The electric drive unit 1 serves for driving a motor vehicle, not shown here. The drive unit 1 exhibits an electric machine 2, an inverter 3, connected upstream of the electric machine 2, and also a gear mechanism 4. The electric machine 2 exhibits a stator 5 and also a rotor 6 which is mounted so as to be rotatable with respect to the stator 5. The rotor 6 is coupled via a rotor shaft 7 with the gear mechanism 4 which here transmits a torque of the rotor 6 to wheels 9 of the motor vehicle via various gear stages 8. For the purpose of operating the electric machine 2, phases U, U' V, V', W, W' of the stator 5 are energized by the inverter 3. Here, the electric machine 2 takes the form of a six-phase rotating-field machine which exhibits a first phase system, consisting of phases U, V, W, and a second phase system consisting of phases U', V', W'. The inverter 3 exhibits a number, corresponding to the number of phases U, U', V, V', W, W' of the stator 5, of phase windings or half-bridges with controllable switches. Here, the inverter 3 exhibits a first switching unit 10, which is electrically connected to the first phase system, and a parallel second switching unit 11 which is electrically connected to the second phase system. Each switching unit 10, 11 exhibits three half-bridges with controllable switches. For the purpose of energizing the phases U, U', V, V', W, W' in accordance with predetermined switching sequences, the switches are actuated in such a manner that a rotating magnetic field which drives the rotor 6 is generated in the rotating-field machine 2.

Since power dissipation in the form of dissipated heat arises during the operation of the inverter 3, the inverter 3 is cooled. For this purpose, the drive unit 1 here exhibits two coolant circuits 12, 13 represented in sections (broken lines). The first coolant circuit 12 serves for cooling the first switching unit 10, in that a coolant circulating in the first coolant circuit 12 flows through the first switching unit 10. The second coolant circuit 13 serves for cooling the second switching unit 11 and also the stator 5. For this purpose, a coolant circulating in the second coolant circuit 13 flows through the second switching unit 11 and also through the stator 5. The coolant or refrigerant may be a cooling liquid, for instance water.

In addition, the drive unit 1 exhibits a lubricant circuit 14 (solid lines) in which a lubricant 15 for lubricating the gear mechanism 4 circulates. The lubricant 15 may be oil, for instance, and is supplied from a reservoir 16, for instance an oil pan, via a filter 17 to the gear mechanism 4 for the purpose of lubricating, and back again to the reservoir 16 via a first return path 18. Here, in addition, the lubricant 15 is routed through the rotor shaft 7 taking the form of a hollow body for the purpose of cooling the rotor 6, and is routed back again into the reservoir 16 via a second return path 19.

The lubricant circuit 14 and the first coolant circuit 12 are thermally coupled via a lubricant/coolant heat-exchanger 20. In normal operation of the electric machine 2, the heat-exchanger 20 transfers heat of the lubricant 15 to the coolant in the first coolant circuit 12, in order to cool the lubricant 15. In this way, the lubricant 15 can be prevented from exceeding a certain upper temperature limit, for instance 100° C.

In the course of driving the motor vehicle away when the lubricant 15 is at ambient temperature, the lubricant 15 in addition displays a high viscosity. This is undesirable, because it results in losses in the gear mechanism 4. Therefore the lubricant 15 is heated up if its temperature falls below a predetermined lower temperature limit, in particular 60° C. This temperature can be registered, for instance by a temperature sensor, not shown here, in the lubricant circuit 14, and provided to a control device 21 of the drive unit 1. For the purpose of heating up the lubricant 15, the first switching unit 10 is actuated by the control device 21 of the drive unit 1 in such a manner that its power dissipation is increased. The first switching unit 10 is accordingly operated by the control device 21 in a loss-increasing operating mode. The second switching unit 11 can meanwhile be operated by the control device 21 in a loss-optimal operating mode. The switching units 10, 11 can accordingly be operated asymmetrically by the control device 21. For this purpose, switches of the first switching unit 10 can, for instance, be operated at a switching frequency that exceeds a predetermined threshold value and is higher than the switching frequency of the second switching unit 11. Alternatively or additionally, the control device 21 can actuate the switching units 10, 11 in such a manner that more power is transmitted via the first switching unit 10 than via the second switching unit 11.

By virtue of the increased power dissipation of the first switching unit 10, the coolant of the first coolant circuit 12 flowing through the first switching unit 10 is heated up. This heated coolant is supplied to the heat-exchanger 20 connected in series downstream of the first switching unit 10. The heat-exchanger 20 transfers the heat of the coolant from the first coolant circuit 12 to the lubricant circuit 14. Therein the lubricant 15 then warms up, and the viscosity of the lubricant 15 decreases. Consequently the lubricant 15 can be reliably conducted to the gear mechanism 4 for the purpose of lessening frictional losses in the gear mechanism 4.

LIST OF REFERENCE SYMBOLS

1 drive unit
2 electric machine
3 inverter
4 gear mechanism
5 stator
6 rotor
7 rotor shaft
8 gear stages
9 wheels
10 first switching unit
11 second switching unit
12 first coolant circuit
13 second coolant circuit
14 lubricant circuit
15 lubricant
16 reservoir
17 filter
18 first return path
19 second return path
20 heat-exchanger
21 control device
U, U', V, V', W, W' phases

What is claimed is:

1. An electric drive unit for a motor vehicle comprising:
   an electric machine with a stator and a rotor;
   an inverter connected upstream of the electric machine comprising a first switching unit to energize a first phase system of the stator;
   a gear mechanism connected to the rotor to transmit torque;
   a lubricant circuit to lubricate the gear mechanism and/or to cool the rotor;
   a first coolant circuit to cool the first switching unit;
   a lubricant/coolant heat-exchanger to thermally couple the first coolant circuit and the lubricant circuit; and
   a control device configured to provide a loss-increasing operating mode to increase power dissipation for the first switching unit and to heat a coolant of the first coolant circuit of the first switching unit, wherein
   the lubricant/coolant heat-exchanger is further configured to transfer heated coolant resulting from the increased power dissipation to the lubricant circuit to decrease a viscosity of a lubricant of the lubricant circuit.

2. The electric drive unit according to claim 1, wherein the control device is further configured to:
   increase switching losses of switches of the first switching unit to increase the power dissipation; and
   switch the switches in the loss-increasing operating mode at a switching frequency higher than a predetermined threshold value of the switching frequency.

3. The electric drive unit according to claim 1, wherein the control device is further configured to:
   actuate switches of the first switching unit such that a power transmitted by the first switching unit to the electric machine is higher than a predetermined power threshold value to increase the power dissipation the control device.

4. The electric drive unit according to claim 1, wherein the first coolant circuit is configured to cool the stator by circulating coolant in the first coolant circuit from the first switching unit in the direction of the stator.

5. The electric drive unit according to claim 4, wherein the lubricant/coolant heat-exchanger is arranged in the first coolant circuit between the first switching unit and the stator to prevent a supply of heated coolant to the stator.

6. The electric drive unit according to claim 1, wherein the inverter further comprises:
   a second switching unit to energize a second phase system of the stator; and
   the electric drive unit further comprises:
   a second coolant circuit to cool the second switching unit and the stator, wherein
   the control device is further configured to provide a loss-optimal operating mode for the second switching unit during the loss-increasing operating mode of the first switching unit.

7. The electric drive unit according to claim 6, wherein the first and second phase systems are three-phase systems;
   the electric machine is a six-phase rotating-field machine based on having the two three-phase systems; and
   the inverter is a six-phase inverter.

8. The electric drive unit according to claim 1, wherein the control device is further configured to provide the loss-increasing operating mode for the first switching unit only when a temperature of the lubricant lies below a predetermined lower temperature limit of 60° C.

9. The electric drive unit according to claim 1, wherein the control device is further configured to:
   determine the power dissipation necessary for decreasing the viscosity as a function of a temperature of the lubricant; and
   actuate the first switching unit in the loss-increasing operating mode such that the first switching unit provides the necessary power dissipation.

10. A motor vehicle with an electric drive unit according to claim 1.

* * * * *